(12) United States Patent
Jakobsson et al.

(10) Patent No.: US 11,569,890 B2
(45) Date of Patent: Jan. 31, 2023

(54) POWER SCALING OF TRANSMISSION SIGNAL DURING TRANSMISSION BEAM CHANGE

(71) Applicant: Telefonaktiebolaget LM Ericsson (publ), Stockholm (SE)

(72) Inventors: Peter Jakobsson, Lund (SE); Johan Thorebäck, Sundbyberg (SE); Vimar Björk, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 91 days.

(21) Appl. No.: 17/044,115

(22) PCT Filed: Apr. 4, 2018

(86) PCT No.: PCT/EP2018/058645
§ 371 (c)(1),
(2) Date: Sep. 30, 2020

(87) PCT Pub. No.: WO2019/192691
PCT Pub. Date: Oct. 10, 2019

(65) Prior Publication Data
US 2021/0021324 A1 Jan. 21, 2021

(51) Int. Cl.
*H04B 7/06* (2006.01)
*H04L 27/26* (2006.01)
*H04L 5/00* (2006.01)

(52) U.S. Cl.
CPC ......... *H04B 7/0695* (2013.01); *H04B 7/0617* (2013.01); *H04L 27/2607* (2013.01); *H04L 5/0007* (2013.01)

(58) Field of Classification Search
CPC . H04B 7/0695; H04B 7/0617; H04L 27/2607; H04L 5/0007
See application file for complete search history.

(56) References Cited

U.S. PATENT DOCUMENTS 9,450,800 B2 9/2016 Funada et al.
2009/0268835 A1* 10/2009 Imai ..................... H04B 7/0697
375/267

(Continued)

FOREIGN PATENT DOCUMENTS

EP 3334070 A1 6/2018
WO 2017022422 A1 9/2017

OTHER PUBLICATIONS

International Search Report dated Mar. 12, 2018 for International Application PCT/EP2018/058645 filed on Apr. 4, 2018, consisting of 13-pages.

*Primary Examiner* — Ian N Moore
*Assistant Examiner* — Sun Jong Kim
(74) *Attorney, Agent, or Firm* — Christopher & Weisberg, P.A.

(57) ABSTRACT

A transmission beam change method is disclosed for a wireless communication transmitter adapted to transmit an orthogonal frequency division multiplex (OFDM) signal using a transmission beam of a plurality of transmission beams available at the wireless communication transmitter. The method includes temporarily adapting an output power during a transmission beam change from one transmission beam to another transmission beam. In some embodiments, the transmission beam change is performed during a cyclic prefix (CP) of an OFDM symbol and the temporary adaptation is applied to only a part of the CP. Temporarily adapting the output power includes decreasing the output power to initiate the temporary adaptation and increasing the output power to terminate the temporary adaptation. In some embodiments, the temporary adaptation is performed during all transmission beam changes or only when an occurrence frequency of transmission beam changes is higher than a threshold value.

10 Claims, 3 Drawing Sheets

(56) References Cited

U.S. PATENT DOCUMENTS

| | | | |
|---|---|---|---|
| 2014/0160966 A1* | 6/2014 | Kang | H04W 72/1205 370/252 |
| 2015/0195015 A1 | 7/2015 | Kim et al. | |
| 2016/0127060 A1* | 5/2016 | Cross | H04W 52/52 375/211 |
| 2017/0251441 A1* | 8/2017 | Axnas | H04B 7/088 |
| 2017/0331577 A1* | 11/2017 | Parkvall | H04W 8/18 |
| 2018/0062692 A1* | 3/2018 | Huh | H04B 1/44 |
| 2018/0123648 A1* | 5/2018 | Nagaraja | H04B 7/043 |
| 2018/0191544 A1* | 7/2018 | Umehara | H04W 72/0446 |

\* cited by examiner

POWER SCALING OF TRANSMISSION SIGNAL DURING TRANSMISSION BEAM CHANGE

CROSS-REFERENCE TO RELATED APPLICATIONS

This application is a Submission Under 35 U.S.C. § 371 for U.S. National Stage Patent Application of International Application Number: PCT/EP2018/058645, filed Apr. 4, 2018 entitled "TRANSMISSION BEAM CHANGE MANAGEMENT," the entirety of which is incorporated herein by reference.

TECHNICAL FIELD

The present disclosure relates generally to the field of wireless communication. More particularly, it relates to management of transmission beam changes in wireless communication.

BACKGROUND

One technique to improve system performance in wireless communication is to use an advanced antenna system (AAS). This technique is considered, for example, in relation to standardization and implementation of fifth generation (5G) of cellular communication systems. Properly controlled advanced antenna arrays enable beamforming for transmission and/or reception, which can be used to increase capacity and/or coverage for a cellular communication system.

An array of antennas, or antenna array, may be controlled by controlling the phase of a signal at the different antenna elements of the antenna array. Alternatively, an antenna array may be controlled by controlling a time delay at the different antenna elements of the antenna array. Yet alternatively, an antenna array may be controlled by controlling the phase and amplitude of a signal at the different antenna elements of the antenna array.

Several different techniques exist to control the relative phase (or time delay) between radio frequency (RF) signals of the array. Examples of such techniques include analog beamforming, digital beamforming and hybrid beamforming; all of which are well known in the art.

In analog beamforming, phase shift (or time delay) is typically applied to the RF-signal or to the local oscillator (LO) signal that is used for up/down conversion of the transmission/reception signal. In digital beamforming, phase shift (or time delay) is typically implemented digitally, e.g., by digitally phase shifting an orthogonal frequency division multiplexing (OFDM) modulated signal in time or frequency domain. Hybrid beamforming is a mixture of analog and digital beamforming.

FIG. 1 illustrates example transmitter arrangements for analog beamforming (a), digital beamforming (b) and hybrid beamforming (c).

As illustrated in part (a) of FIG. 1, analog beamforming may be achieved in relation to a processing chain comprising a modulator (MOD), an inverse fast Fourier transform (IFFT), a digital front end (DFE), a digital-to-analog converter (DAC), a low pass filter (LPF) (or band pass filter, BPF) and a mixer (MIX). Analog beamforming may be achieved by properly phase shifting the signal for each antenna element before amplifying the signal in respective power amplifiers (PA). In part (a) of FIG. 1, the phase shift is illustrated by phase shifters (SF), but may be implemented in any suitable way. For example, the local oscillator (LO) signal used for up-conversion in the mixer may be phase (and possibly amplitude) shifted to provide the signal for each antenna element.

Part (b) of FIG. 1 illustrates digital beamforming, where the signal to be transmitted is digitally shifted in phase or time (and possibly in amplitude) in a beamformer (BF). For an orthogonal frequency division multiplexing (OFDM) signal, for example, the shifting may be performed in time or frequency domain. In part (b) of FIG. 1, the beamformer is illustrated as inserted, in processing chains of the respective antenna elements, after the modulators (MOD) of the processing chains. Each of the processing chains of this example also comprise, after the beamformer, an inverse fast Fourier transform (IFFT), a digital front end (DFE), a digital-to-analog converter (DAC), a low pass filter (LPF) (or band pass filter, BPF), a mixer (MIX), and a power amplifier (PA).

Part (c) of FIG. 1 illustrates hybrid beamforming which is a mélange of analog beamforming via analog shifting (SH) and digital beamforming via a digital beamformer (BF).

When a change in beam direction is performed, the corresponding changes in phase/time/amplitude shifts will typically result in a spectrum broadening of the signal. In digital beamforming (and to some extent in hybrid beamforming) the spectrum broadening may be mitigated by the channel filtering (e.g., the low pass filters, LPF, of FIG. 1).

However, such mitigation will not address the analog part of the beamforming in the case of hybrid beamforming, and is not available at all for pure analog beamforming. Thus, the transmitted signal will have a broadened spectrum due to beam change in these approaches.

As a consequence, the adjacent channel leakage ratio (ACLR) will be degraded, which may in turn cause a loss in capacity on adjacent channels and/or difficulties to fulfill regulatory emission limits.

To serve many users with low latency the beam direction may need to be changed quite frequently. Furthermore, performing a beam sweep typically comprises a large amount of beam changes in a short time span. In some example scenarios, the beam direction may change as often as once per OFDM symbol. In systems using OFDM, a change in beam direction is typically done in the cyclic prefix (CP) of OFDM symbols.

Therefore, there is a need for alternative approaches to beam change management. Preferably, such approaches avoid, or at least mitigate, the spectrum broadening caused by beam changes.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a transmission beam change method for a wireless communication transmitter adapted to transmit an orthogonal frequency division multiplex (OFDM) signal using a transmission beam of a plurality of transmission beams available at the wireless communication transmitter.

The method comprises temporarily adapting an output power during a transmission beam change from one transmission beam to another transmission beam.

In some embodiments, the temporary adaptation is performed during all transmission beam changes.

In some embodiments, the method further comprises determining an occurrence frequency of transmission beam changes, and temporarily adapting the output power only when the occurrence frequency is higher than a threshold value.

In some embodiments, temporarily adapting the output power comprises temporarily setting the output power to zero.

In some embodiments, temporarily adapting the output power comprises decreasing the output power to initiate the temporary adaptation and increasing the output power to terminate the temporary adaptation.

In some embodiments, decreasing and/or increasing comprises application of one of a linear change of output power, a stepwise change of output power, and a change of output power in accordance with a root raised cosine function.

In some embodiments, the transmission beam change is performed during a cyclic prefix (CP) of an OFDM symbol and the temporary adaptation is applied to only a part of the CP.

In some embodiments, the temporary adaptation is implemented by scaling an amplitude of samples of the OFDM signal.

In some embodiments, the scaling is performed in a baseband processing unit, the transmission beam change is controlled by a radio processing unit, and the baseband processing unit is connected to the radio processing unit via an interface associated with a transfer delay. Then, the method may further comprise time synchronizing the scaling to the transmission beam change responsive to the transfer delay.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a transmission beam change arrangement for a wireless communication transmitter adapted to transmit an orthogonal frequency division multiplex (OFDM) signal using a transmission beam of a plurality of transmission beams available at the wireless communication transmitter.

The arrangement comprises controlling circuitry configured to cause temporary adaptation of an output power during a transmission beam change from one transmission beam to another transmission beam.

In some embodiments, the arrangement further comprises a multiplier configured to scale an amplitude of samples of the OFDM signal responsive to control signaling received from the controlling circuitry.

In some embodiments, the arrangement further comprises beam forming circuitry configured to perform the transmission beam change.

In some embodiments, the arrangement further comprises an active antenna system for transmission of the OFDM signal using the transmission beam.

A fourth aspect is a network node comprising the arrangement of the third aspect.

A fifth aspect is a baseband unit comprising the arrangement of the third aspect.

A sixth aspect is a wireless communication device comprising the arrangement of the third aspect.

In some embodiments, any of the above aspects may additionally have features identical with or corresponding to any of the various features as explained above for any of the other aspects.

An advantage of some embodiments is that alternative approaches to beam change management are provided.

Another advantage of some embodiments is that spectrum broadening caused by beam changes may be avoided, or at least mitigated.

Yet an advantage of some embodiments is that the ACLR is not degraded, at least not to the same extent as in the prior art.

Yet another advantage of some embodiments is that adjacent channel capacity is improved and/or that fulfillment of regulatory emission limits is facilitated.

Another advantage of some embodiments is that they cause no, or low, error vector magnitude (EVM) impact of the transmitted signal. This advantage may be achieved when the output power adaptation extends over a minor part of the CP, for example.

Furthermore, even if spectrum broadening may be mitigated by channel filtering for digital and hybrid beamforming, the alternative mitigation provided by application of some embodiments may result in that the requirements on channel filtering may be relaxed (e.g., a lower number of channel filters and/or channel filters with less strict filter masks may be sufficient when embodiments are practiced).

According to some embodiments, there is no, or low, impact on the downlink data rate. In typical scenarios, this may be achieved as long as the time dispersion is less than 80% of the length of the cyclic prefix.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described for mitigating spectrum broadening caused by beam changes.

Figure 2:
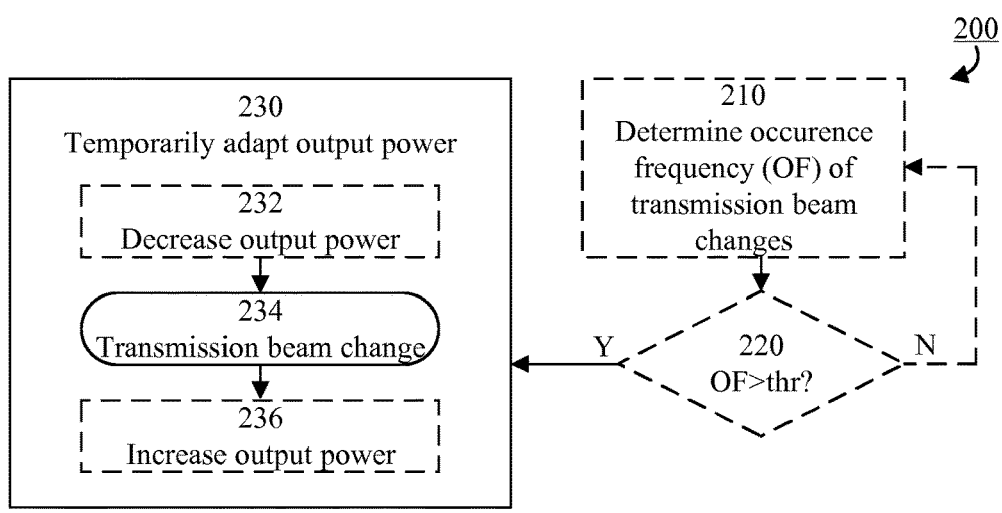
FIG. 2 is a flowchart illustrating example method steps according to some embodiments.

FIG. 2 illustrates an example method 200 for transmission beam change. The method is for a wireless communication transmitter adapted to transmit an orthogonal frequency division multiplex (OFDM) signal using a transmission beam of a plurality of transmission beams (each beam typically being associated with a corresponding beam direction) available at the wireless communication transmitter.

As illustrated by step 230, the method comprises temporarily adapting an output power during a transmission beam change 234 from one transmission beam to another transmission beam. The temporary adaptation may be performed such that a spectrum broadening due to the transmission beam change 234 is counteracted.

The temporary adaptation may be performed in response to a determination that a beam change 234 is to be initiated. In some embodiments, the output power is temporarily adapted exclusively during the transmission beam change 234.

In some embodiments, the temporary adaptation is performed during all transmission beam changes. Alternatively, the temporary adaptation is performed only when an adaptation criterion is fulfilled.

For example, the method may comprise determining an occurrence frequency (OF) of transmission beam changes as illustrated by optional step 210 and temporarily adapting the output power (step 230) only when the occurrence frequency is higher than a threshold value, thr, (Y-path out of step 220). The threshold value may be static (e.g. pre-determined), semi-static or dynamic. For example, the threshold value may be based on requirements on ACLR and/or regulatory emission limits.

Other adaptation criteria may be applied alone or in combination with the criterion of the occurrence frequency being higher than the threshold value. For example, the temporary adaptation may always be performed when beam sweeps are executed.

Temporarily adapting the output power may comprise temporarily lowering an output power level. For example, temporarily adapting the output power may comprise temporarily setting the output power to zero or to another value between zero and a default output power. Generally, when a default output power is referred to herein, it may for example be the output power that would have been used if embodiments presented herein where not applied.

Typically, temporarily adapting the output power may comprise decreasing the output power as illustrated by optional sub-step 232 to initiate the temporary adaptation, and increasing the output power as illustrated by optional sub-step 236 to terminate the temporary adaptation. Increasing the output power may comprise increasing the output power to the same output power as before the output power was decreased (e.g., a default output power level).

Decreasing and/or increasing the output power may be according to any suitable decrease/increase function. For example, decreasing and/or increasing the output power may comprise linear application of one of: a linear change of output power (a ramp), a stepwise change of output power, and a change of output power in accordance with a root raised cosine function. The latter has the advantage that it distorts the spectrum less than a linear or stepwise change of output power.

The temporary adaptation may be initiated in response to a determination that a beam change 234 is to be initiated and/or may be terminated in response to a determination that the beam change 234 is completed. In some embodiments, the output power is temporarily adapted exclusively during the transmission beam change 234.

In some embodiments, the transmission beam change is performed during a cyclic prefix (CP) of an OFDM symbol and the temporary adaptation is applied to only a part of the CP. Typically such a part may be small compared to the length of the CP, e.g., in any of the ranges 0.01-10%, 0.1-10%, 1-10%. In some embodiments, the part is interior to the CP.

Temporarily adapting the output power may be seen as applying an amplitude window to the signal to be transmitted. It is important to note that an explicit purpose of the amplitude window according to embodiments herein is to mitigate spectrum broadening due to transmission beam change. Thus, the amplitude window is applied to manage transmission beam change. Hence, the amplitude window only needs to be applied during the transmission beam change according to some embodiments.

This is in contrast to amplitude windowing of signals to be transmitted for the purpose of handling discontinuities and other problems associated with (e.g., OFDM) symbol boundaries, where the windowing must overlap the symbol boundaries to be effective.

The temporary adaptation may be implemented by scaling (e.g. multiplication with a scaling factor) the amplitude of samples of the OFDM signal. When such scaling is performed in a baseband processing unit and the transmission beam change is controlled by a radio processing unit, wherein the baseband processing unit is connected to the radio processing unit via an interface associated with a transfer delay, the method may further comprise time synchronizing the scaling to the transmission beam change responsive to the transfer delay.

Figure 1:
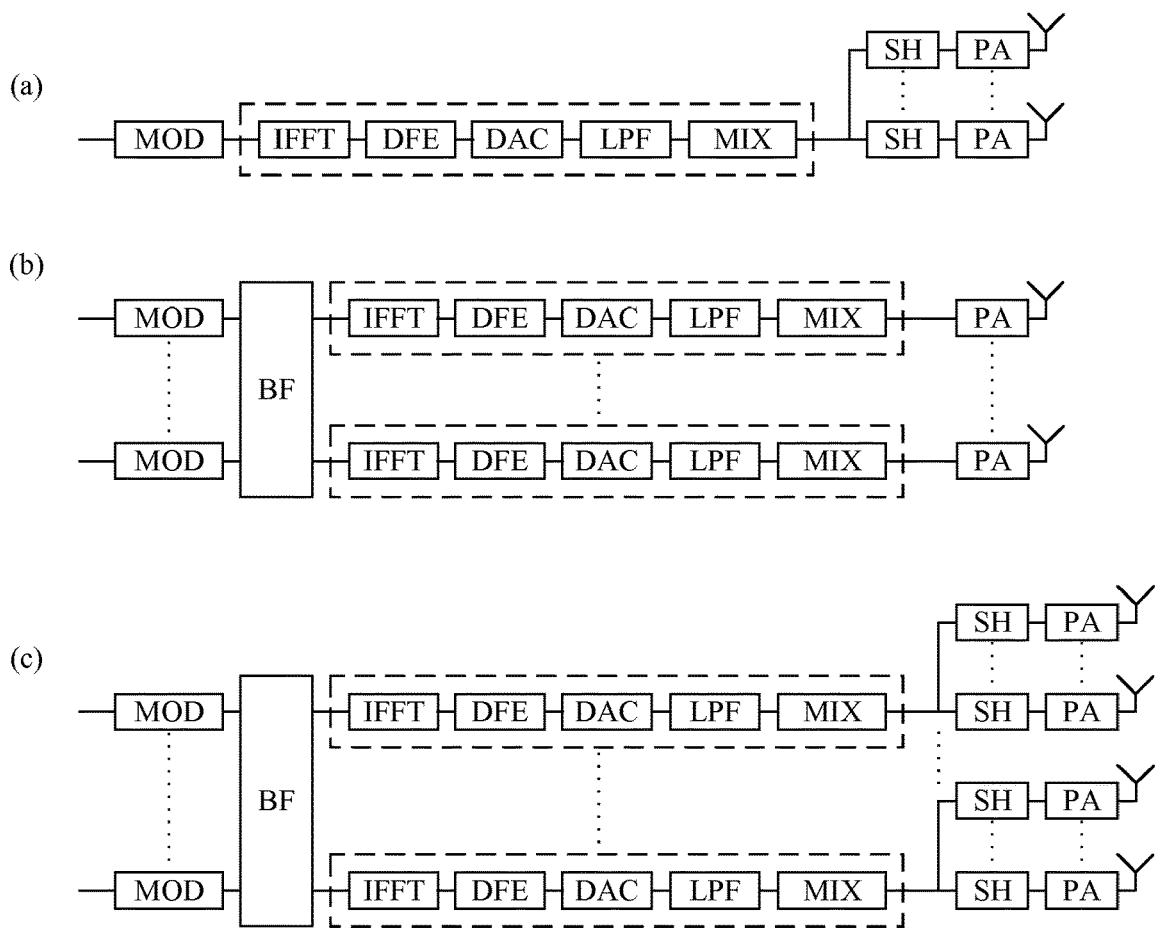
FIG. 1 is a schematic block diagram illustrating an example arrangement for beamforming.
Figure 3:
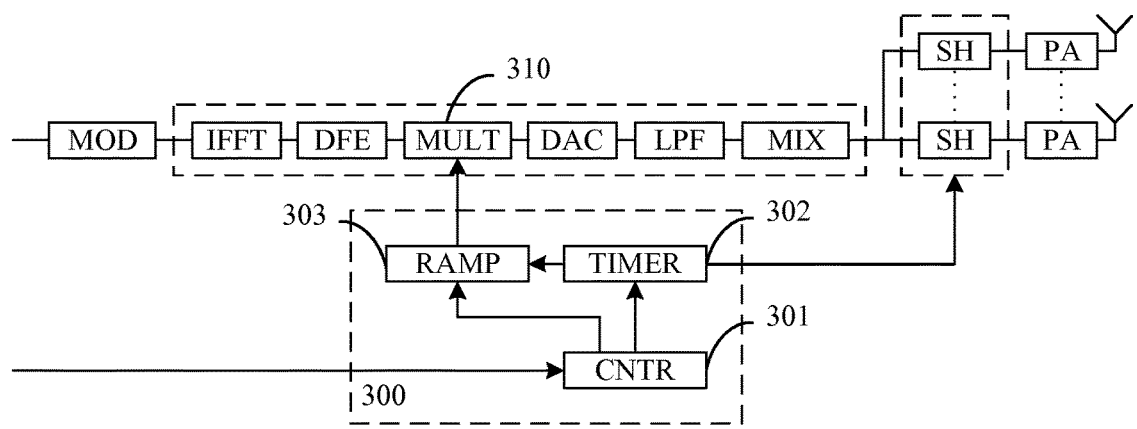
FIG. 3 is a schematic block diagram illustrating an example arrangement according to some embodiments.

FIG. 3 schematically illustrates an example arrangement 300 for transmission beam change management in association with analog beamforming (compare with part (a) of FIG. 1). A similar arrangement may be applied for transmission beam change management in association with hybrid beamforming (compare with part (c) of FIG. 1).

In the example of FIG. 3, a multiplier (MULT) 310 is inserted between the digital front end (DFE) and the digital-to-analog converter (DAC) to enable scaling of the amplitude of samples of the signal to be transmitted. Thereby, adjustment of output power may be provided as explained above. The multiplier 310 may be comprised in, or otherwise associated with, the arrangement 300.

The arrangement 300 may comprise controlling circuitry (CNTR) 301, timing circuitry (TIMER) 302 and ramping circuitry (RAMP) 303. The arrangement 300 may in itself be seen as controlling circuitry according to some embodiments.

In an example application, the controlling circuitry may receive a control signal to trigger temporary adaptation of the output power. In response thereto, the controlling circuitry triggers the ramping circuitry to start decreasing the output power by lowering the scaling factor and informs the timing circuitry that the decreasing of the output power has started. When the decrease of the output power is complete, the timing circuitry triggers the phase shifters (SF) to start the transmission beam shift. Then, when the transmission beam shift is complete, the timing circuitry triggers the ramping circuitry to start increasing the output power by increasing the scaling factor.

In an alternative to FIG. 3, the multiplier may be placed before DFE. Then, the ramping is included in the creation of the cyclic prefix. This may provide advantages in terms of finding a suitable ramping function. In this context it may be beneficial to consider interaction between the ramping and digital pre-distortion (DPD) of the DFE, so that the DPD performance is not deteriorated. In some embodiments, a control signal (e.g. an interrupt) may be sent to the DPD in coordination with the ramping to adapt the DPD settings (e.g., look-up tables, LuT) to better accommodate the ramping.

Figure 4:
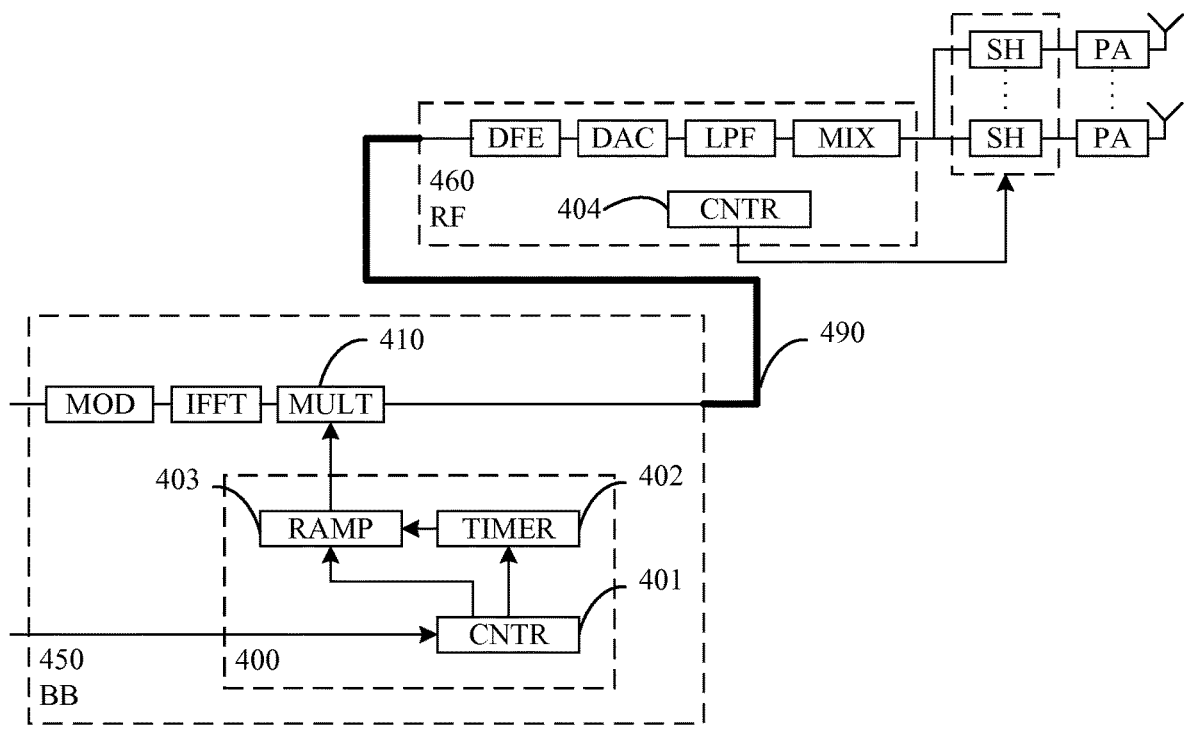
FIG. 4 is a schematic block diagram illustrating an example arrangement according to some embodiments.

FIG. 4 schematically illustrates an example arrangement 400 for transmission beam change management in association with analog beamforming (compare with part (a) of FIG. 1). A similar arrangement may be applied for transmission beam change management in association with hybrid beamforming (compare with part (c) of FIG. 1).

In the example of FIG. 4, the processing chain for the signal to be transmitted is divided so that a first part of the processing (MOD, IFFT) is performed by a baseband processing unit (BB) 450 and a first part of the processing (DFE, DAC, LPF, MIX), including the transmission beam change, is controlled by a radio processing unit (RF) 460. The baseband processing unit is connected to the radio processing unit via an interface 490 associated with a transfer delay. The transfer delay may, for example, be due to that the interface 490 connects the baseband processing unit and the radio processing unit over a large distance and/or due to processing delay of the interface 490.

The interface may, for example, be a common public radio interface (CPRI), the baseband processing unit may be comprised in a central unit (CU) and the radio processing unit may be comprised in a remote unit (RU).

A multiplier (MULT) 410 is comprised in the baseband unit 450, after the IFFT, to enable scaling of the amplitude of samples of the signal to be transmitted. Thereby, adjustment of output power may be provided as explained above. The multiplier 410 may be comprised in, or otherwise associated with, the arrangement 400.

The arrangement 400 may comprise controlling circuitry (CNTR) 401, timing circuitry (TIMER) 402 and ramping circuitry (RAMP) 403. The arrangement 400 may in itself be seen as controlling circuitry according to some embodiments.

In an example application, the controlling circuitry may receive a control signal to trigger temporary adaptation of the output power. In response thereto, the controlling circuitry triggers the ramping circuitry to start decreasing the output power by lowering the scaling factor and informs the timing circuitry that the decreasing of the output power has started.

When the decrease of the output power is complete, controlling circuitry (CNTR) 404 comprised in the radio frequency triggers the phase shifters (SF) to start the transmission beam shift. Then, when the transmission beam shift is complete, the timing circuitry triggers the ramping circuitry to start increasing the output power by increasing the scaling factor.

Some form of time synchronization may be needed between the scaling and the transmission beam change to accommodate the transfer delay caused by the interface 490, i.e., such that arrival, at the radio processing unit, of the samples with temporarily adapted amplitude is aligned with the transmission beam change by the radio processing unit. Time synchronization may be accomplished in any suitable way, for example, via control signaling between the baseband processing unit and the radio processing unit.

The controlling circuitry 404 typically needs to know when the decrease of the output power is complete. This may be accomplished by the timing circuitry time stamping information (e.g. samples for transmission) sent to the radio processing unit, e.g., to indicate when the decrease of the output power starts and/or ends (if the duration of the decreasing step is known to the radio processing unit). In typical scenarios, the timing circuitry may be aware of a duration of time (possibly with some safety slack) in which the transmission beam shift can be completed. Thereby, the timing circuitry can assume that the transmission beam shift is complete when the duration of time has passed, starting from when the decrease of the output power is complete.

Figure 5:
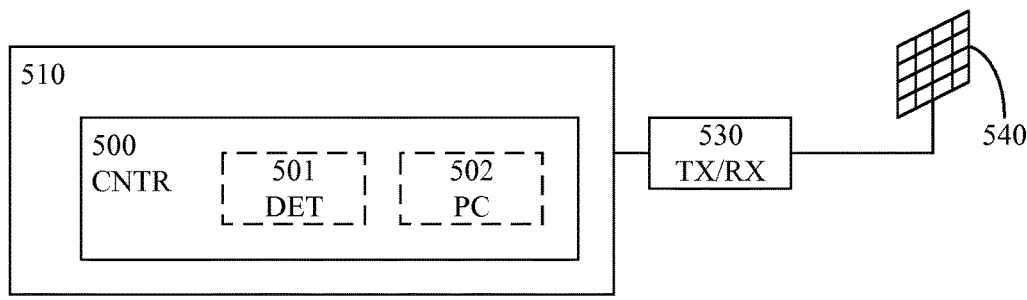
FIG. 5 is a schematic block diagram illustrating an example arrangement according to some embodiments.

FIG. 5 schematically illustrates an example arrangement 510 according to some embodiments. In some embodiments, the arrangement 510 may be seen as a generalized for of the example arrangements of FIGS. 4 and 5. In some embodiments, the arrangement 510 may be configured to cause execution of method steps as exemplified above in connection to FIG. 2.

The arrangement 510 may be comprised in an electronic device, e.g., a network node, a baseband unit, or a wireless communication device. The electronic device may comprise, be connectable to, or be otherwise associable to an active antenna array 540 and a transmitter (illustrated in FIG. 4 as a transceiver, TX/RX) 530, for transmission of signals an orthogonal frequency division multiplex, OFDM, signal using a transmission beam of a plurality of transmission beams available at the wireless communication transmitter.

Thus, the arrangement 510 is a transmission beam change arrangement for a wireless communication transmitter adapted to transmit an OFDM signal using a transmission beam of a plurality of transmission beams available at the wireless communication transmitter.

The arrangement comprises controlling circuitry (CNTR) 500 configured to cause temporary adaptation of an output power during a transmission beam change from one transmission beam to another transmission beam (compare with step 230 of FIG. 2). For example, the controlling circuitry may be configured to temporarily adapt the output power.

To this end the controlling circuitry may comprise, or be otherwise associated with, power control circuitry (PC) 502 configured to temporarily adapt the output power.

The controlling circuitry may be configured to cause performance of the temporary adaptation during all transmission beam changes or only when an adaptation criterion is fulfilled as exemplified above. For example, the controlling circuitry may be further configured to cause determination of an occurrence frequency of transmission beam changes, and temporarily adaptation of the output power only when the occurrence frequency is higher than a threshold value.

To this end the controlling circuitry may comprise, or be otherwise associated with, determination circuitry (DET) 501 configured to determine the occurrence frequency.

The controlling circuitry may be configured to cause the temporary adaptation by causing (e.g., via the power control circuitry) decreasing of the output power to initiate the temporary adaptation and increasing of the output power to terminate the temporary adaptation.

The controlling circuitry may be configured to cause the temporary adaptation by causing scaling of an amplitude of samples of the OFDM signal. To this end, the controlling circuitry may comprise, or be otherwise associated with, multiplication circuitry (e.g., a multiplier, not shown in FIG. 5) configured to scale the amplitude of the samples of the OFDM signal responsive to control signaling received from the controlling circuitry. Such control signaling may comprise a trigger to decrease and/or increase the scaling factor. Alternatively or additionally, the control signaling may be indicative of the value of the scaling factor.

Figure 6:
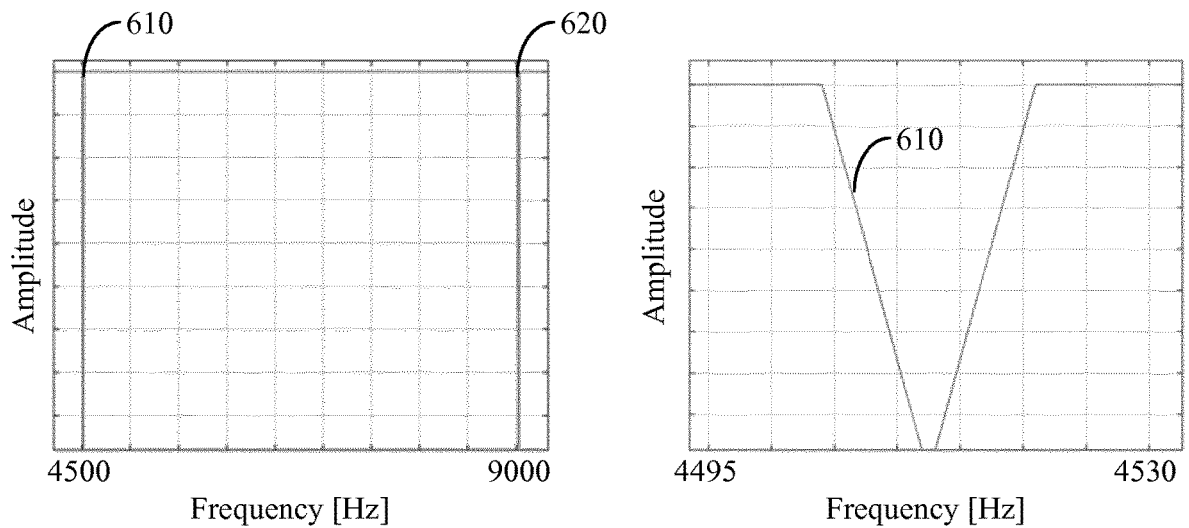
FIG. 6 is a collection of plots illustrating example adjustments and resulting spectra according to some embodiments.
Figure 6:
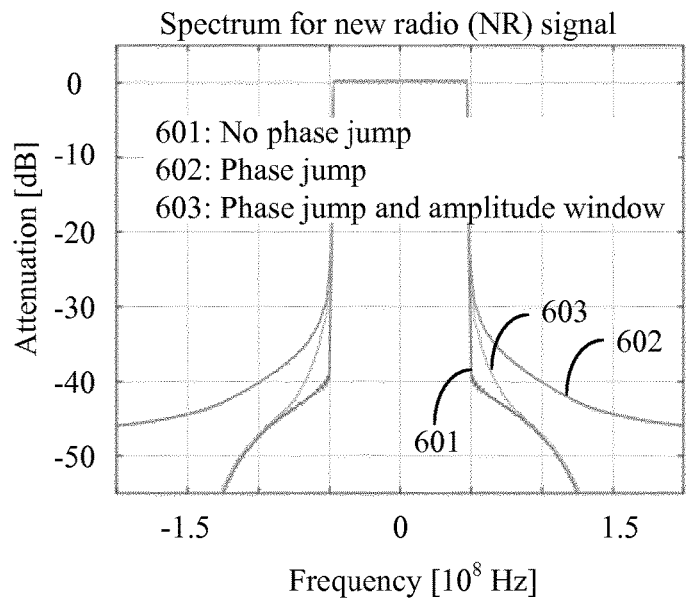

FIG. 6 is a collection of simulation plots illustrating example adjustments and resulting spectra according to some embodiments. The upper two plots illustrate two amplitude windows 610, 620 applied in the simulations (left) and a zoomed view of one of the amplitude windows 610 (right). The lower plot is an illustration of example resulting spectra when there is no transmission beam change ("No phase jump", 601), when there is transmission beam change without application of amplitude window ("Phase jump", 602), and when there is transmission beam change and amplitude window is applied ("Phase jump and amplitude window", 603). The lower plot shows that the ACLR degradation due to transmission beam change may be severe (compare 601 and 602) and that application of an amplitude window mitigates the ACLR degradation (compare 602 and 603).

Thus, according to various embodiments, improved spectral efficiency is provided for analog/hybrid beamforming (BF) active antenna array (AAS) transmitters. This may be achieved by ramping the signal power up and down in synchronicity with the transmission beam change, thereby avoiding (or at least mitigating) spectrum broadening of the transmitted signal.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 7:
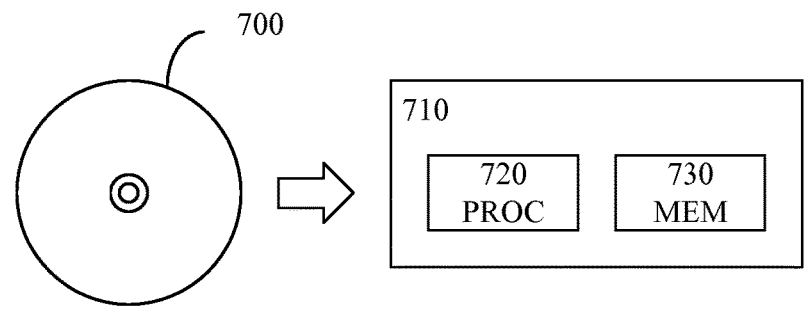
FIG. 7 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC) 720, which may, for example, be comprised in a wireless communication device or a network node 710. When loaded into the data processing unit, the computer program may be stored in a memory (MEM) 730 associated with or comprised in the data-processing unit. According to some embodiments, the computer program may, when loaded into and run by the data processing unit, cause execution of method steps according to, for example, the method illustrated in FIG. 2 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A transmission beam change method for a wireless communication transmitter adapted to transmit an orthogonal frequency division multiplex (OFDM) signal using a transmission beam of a plurality of transmission beams available at the wireless communication transmitter, the method comprising:

temporarily adapting an output power during a transmission beam change from one transmission beam to another transmission beam, the temporary adaptation being implemented by scaling an amplitude of samples of the OFDM signal, the scaling being performed in a baseband processing unit and the transmission beam change being controlled by a radio processing unit, the baseband processing unit being connected to the radio processing unit via an interface associated with a transfer delay;

time synchronizing the scaling to the transmission beam change responsive to the transfer delay;

determining an occurrence frequency of transmission beam changes; and temporarily adapting the output power only when the occurrence frequency is higher than a threshold value, the temporarily adapting the output power comprising: decreasing the output power to initiate the temporary adaptation; and increasing the output power to terminate the temporary adaptation, and at least one of the decreasing or the increasing comprising changing the output power in accordance with a root raised cosine function.

2. The method of claim 1, wherein the temporary adaptation is performed during all transmission beam changes.

3. The method of claim 1, wherein the temporarily adapting the output power comprises temporarily setting the output power to zero.

4. The method of claim 1, wherein the transmission beam change is performed during a cyclic prefix (CP) of an OFDM symbol and wherein the temporary adaptation is applied to only a part of the CP.

5. A transmission beam change arrangement for a wireless communication transmitter adapted to transmit an orthogonal frequency division multiplex (OFDM) signal using a transmission beam of a plurality of transmission beams available at the wireless communication transmitter, the arrangement comprising:

controlling circuitry, the controlling circuitry being configured to cause:
 temporary adaptation of an output power during a transmission beam change from one transmission beam to another transmission beam;
a multiplication circuitry configured to scale an amplitude of samples of the OFDM signal responsive to control signaling received from the controlling circuitry;
a baseband processing unit configured to perform the scaling;
a radio processing unit configured to control the transmission beam change, the baseband processing unit being connected to the radio processing unit via an interface associated with a transfer delay; and
the controlling circuitry is further configured to cause:
 time synchronizing of the scaling to the transmission beam change responsive to the transfer delay;
 determination of an occurrence frequency of transmission beam changes; and
 temporary adaptation of the output power only when the occurrence frequency is higher than a threshold value, the temporary adaptation of the output power comprising: decreasing the output power to initiate the temporary adaptation; and increasing the output power to terminate the temporary adaptation, and at least one of the decreasing or the increasing comprising changing the output power in accordance with a root raised cosine function.

6. The arrangement of claim 5, wherein the controlling circuitry is configured to cause performance of the temporary adaptation during all transmission beam changes.

7. The arrangement of claim 5, wherein the controlling circuitry is configured to cause the temporary adaptation by causing the scaling of the amplitude of the samples of the OFDM signal.

8. The arrangement of claim 5, further comprising beam forming circuitry configured to perform the transmission beam change.

9. The arrangement of claim 5, further comprising an active antenna system for transmission of the OFDM signal using the transmission beam.

10. A baseband unit comprising a transmission beam change arrangement for a wireless communication transmitter adapted to transmit an orthogonal frequency division multiplex (OFDM) signal using a transmission beam of a plurality of transmission beams available at the wireless communication transmitter and a radio processing unit configured to control a transmission beam change, the arrangement comprising:

controlling circuitry, the controlling circuitry being configured to cause:
 temporary adaptation of an output power during a transmission beam change from one transmission beam to another transmission beam;
a multiplication circuitry configured to scale an amplitude of samples of the OFDM signal responsive to control signaling received from the controlling circuitry; and
a baseband processing unit configured to perform the scaling, the baseband processing unit being connected to the radio processing unit via an interface associated with a transfer delay;
the controlling circuitry is further configured to cause:
 time synchronizing of the scaling to the transmission beam change responsive to the transfer delay;
 determination of an occurrence frequency of transmission beam changes; and
 temporary adaptation of the output power only when the occurrence frequency is higher than a threshold value, the temporary adaptation of the output power comprising: decreasing the output power to initiate the temporary adaptation; and increasing the output power to terminate the temporary adaptation, and at least one of the decreasing or the increasing comprising changing the output power in accordance with a root raised cosine function.

* * * * *